United States Patent
Jain et al.

(10) Patent No.: US 11,496,589 B2
(45) Date of Patent: Nov. 8, 2022

(54) ZERO DAY ZERO TOUCH PROVIDING OF SERVICES WITH POLICY CONTROL

(71) Applicant: Cisco Technology, Inc., San Jose, CA (US)

(72) Inventors: Prakash C. Jain, Fremont, CA (US); Sanjay Kumar Hooda, Pleasanton, CA (US); Rajeev Kumar, Sunnyvale, CA (US); Ramesh Yeevani-Srinivas, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 32 days.

(21) Appl. No.: 17/097,709

(22) Filed: Nov. 13, 2020

(65) Prior Publication Data

US 2022/0159083 A1    May 19, 2022

(51) Int. Cl.
  *G06F 15/173*   (2006.01)
  *H04L 67/51*   (2022.01)
  *H04L 65/1073*   (2022.01)

(52) U.S. Cl.
  CPC .......... H04L 67/51 (2022.05); H04L 65/1073 (2013.01)

(58) Field of Classification Search
  CPC ...... H04L 67/16; H04L 67/51; H04L 65/1073
  USPC ........................................................ 709/223
  See application file for complete search history.

(56) References Cited

U.S. PATENT DOCUMENTS

| | | | |
|---|---|---|---|
| 10,349,333 B2 | 7/2019 | Pillay-Esnault | |
| 10,637,889 B2 | 4/2020 | Ermagan et al. | |
| 10,652,047 B2 | 5/2020 | Jain et al. | |
| 2016/0065531 A1* | 3/2016 | Xiaopu | H04L 61/103 709/238 |
| 2016/0261579 A1* | 9/2016 | Janakiraman | H04L 67/141 |
| 2018/0091471 A1 | 3/2018 | Hooda et al. | |
| 2019/0141119 A1 | 5/2019 | Bernat et al. | |
| 2019/0227949 A1 | 7/2019 | Bernat et al. | |
| 2019/0268383 A1 | 8/2019 | Maino et al. | |
| 2020/0162282 A1 | 5/2020 | Ashtaputre et al. | |

OTHER PUBLICATIONS

International Search Report and Written Opinion issued in International Application No. PCT/US2021/058441, dated Mar. 9, 2022.

* cited by examiner

*Primary Examiner* — Hee Soo Kim
(74) *Attorney, Agent, or Firm* — Merchant & Gould P.C.

(57) ABSTRACT

Services with policy control may be provided. A computing device may receive registration information associated with a border device. The registration information may comprise information identifying a service provided by a server associated with the border device, information identifying the border device, and policies associated with the service. Then an address for the server may be determined. Next a request may be received comprising the information identifying the service provided by the server. In response to receiving the request comprising the information identifying the service provided by the server, the address for the server, the information identifying the border device, and the policies associated with the service may be provided.

20 Claims, 5 Drawing Sheets

ZERO DAY ZERO TOUCH PROVIDING OF SERVICES WITH POLICY CONTROL

TECHNICAL FIELD

The present disclosure relates generally to providing services with policy control.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
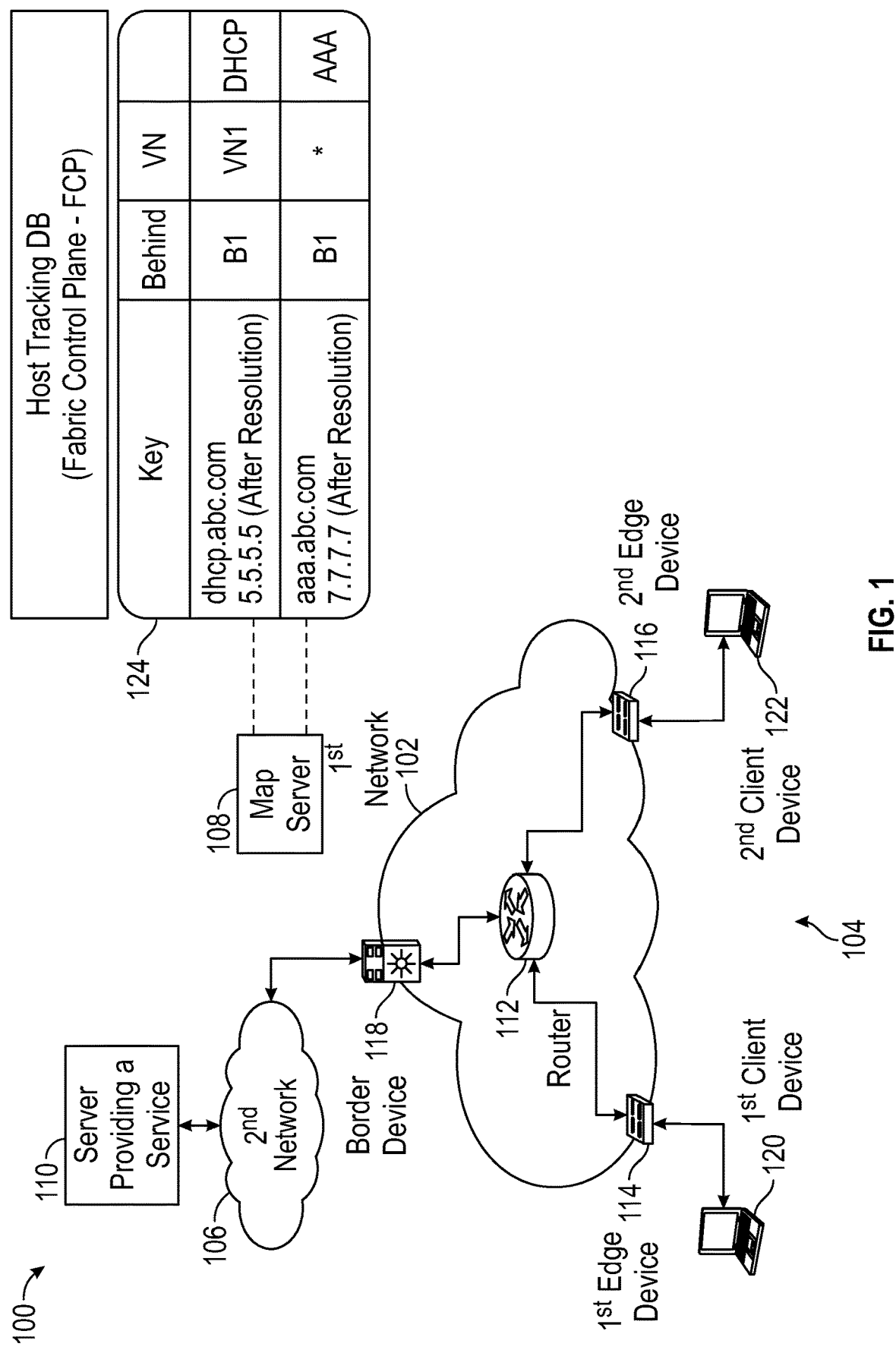
FIG. 1 is a block diagram of a network.

Services with policy control may be provided. A computing device may receive registration information associated with a border device. The registration information may comprise information identifying a service provided by a server associated with the border device, information identifying the border device, and policies associated with the service. Then an address for the server may be determined. Next a request may be received comprising the information identifying the service provided by the server. In response to receiving the request comprising the information identifying the service provided by the server, the address for the server, the information identifying the border device, and the policies associated with the service may be provided.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes (e.g., devices). Fabric networks may comprise an overlay and an underlay. The underlay deals with connectivity between fabric network devices and the overlay deals with user traffic transiting the fabric network. The fabric network overlay may comprise functional components such as Fabric Edge (FE) devices, fabric intermediate devices, Fabric Border (FB) devices, a Map Server (MS), and a fabric Control Plane (CP).

In the fabric network overlay, FE devices may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices or hosts) may be attached to the FE devices. The end points may be in Endpoint Identification space where each endpoint may have an Endpoint Identifier (EID). Each device in the fabric network (e.g., FE devices and FB devices) may be configured with an address (e.g., a locator address). FE devices may register discovered EIDs (from the end points) with a fabric host-tracking database running on the MS associating the discovered EID to, for example, the configured locator address of the FE device that discovered it.

When a local FE device receives a packet from a local end point destined to a remote end point (i.e., on a remote FE device) whose location is not known (e.g., end points connected over the internet), the local FE device may send a map request message to the MS. The MS may have a border device registered as a provider of internet service. In that case, the MS may reply to a map request with a remote locator address that is an address of the internet service border. Once the local FE device receives the reply message back from the MS associating the unknown EID to the remote locator address, all subsequent traffic from the local end point may be encapsulated (e.g., LISP encapsulated) and forwarded to the remote locator address (i.e., remote xTR device). Once the encapsulated packet is received on the remote xTR device, the remote xTR device may decapsulate the packet and forward natively (e.g., to the remote endpoint).

FB devices may connect the fabric network to the native routing domain. FB devices may be configured, for example, as LISP PxTR nodes and may provide a default gateway service to the FE nodes. Communication may happen through the FB device configured, for example, as a LISP PxTR node. When an FE device receives a packet from a local end point destined to a host outside the fabric network in the native routing domain, the FE device may encapsulate and send the packet to the FB device. The FB device may provide, for example, the LISP PxTR functionality and advertise itself as a next-hop address for all the fabric managed EID prefixes to the native routing domain so that it can steer the traffic.

Fabric overlay may provide the following services. For example, fabric overlay may provide stretched Layer-2 service using Layer-3 overlay, which may provide the flexibility of extending a subnet to any part of the fabric network. For example, a subnet may be present across multiple FE devices with the same anycast gateway Internet Protocol (IP) address to allow for roaming by allowing endpoints to continue using the same gateway IP address. The provided services may also include Layer-3 overlay service and built-in mobility.

When fabric networks (e.g., with access switches and routers) are deployed, it may not be known in advance where different cloud based applications (e.g., private, public, or hybrid) or other on-premises applications, services, or servers may be located and what subnet/IP address they may be assigned. Without this network pre-knowledge, the network may be configured and deployed without these application/services support first, and later when application, services, and servers are configured, different components of the network (e.g., edge switches, border devices, control plane servers, firewalls, etc.) may be modified to allow networking paths to and from these new applications, services, and servers. However, this may be a costly and time consuming operation because it may involve complex network reconfigurations and debugging that may need skilled network engineers and network outages. This may also cause reconfiguration and reevaluation of network security mechanisms in place, which may result in security lapses if not done correctly. This may be because the network may already be deployed and operational. All of these issues may create a problem during applications and services deployment. This may, be problematic in enterprises that may handle time critical operations where outages are not acceptable (e.g., hospitals, financial institutions handling high frequency trading or critical financial transactions, mission critical applications like space research, autonomous vehicles, Internet-of-Things (IoT) applications, etc.).

Embodiments of the disclosure may provide for deployment of enterprise fabric networks with the applications and services (e.g., cloud based or on-premises) where there may be no need to know the locations and IP/subnet addresses for applications, services, or server in advance. These services may be unicast, multicast, or broadcast. Moreover, with embodiments of the disclosure, the network may not need to change when these applications, services, or servers are later deployed. Instead, the network may dynamically detect the locations and subnets of the applications, services, and servers and forward the relevant traffic towards those. Any other traffic not intended to go towards these servers (i.e., even if the destination address is the server's address) may be dropped at the edge of the network per the configured policies in the fabric control plane. This not only addresses the aforementioned problems, but may also make enterprise fabric networks more secured.

For example, an enterprise "abc" may have a Dynamic Host Configuration Protocol (DHCP) server "dhcp.abc.com" that may be location scoped: i) East-coast dhcp.abc.com may resolve to 192.168.1.2; West-coast dhcp.abc.com may resolve to 192.168.2.2; and asiapac dhcp.abc.com may resolve to 192.169.2.2. Embodiments of the disclosure may allow the fabric to provide "zero" touch location specific DHCP service for example. A border device (e.g., xTR/border) that is connected to the DHCP server may register as "dhcp.abc.com" (or its resolved address) with a site Map Server (MS) with service type, for example, as "DHCP_SRV" and with its associated policies. The MS may resolve (e.g., with a Domain Name Server (DNS)) and populate its registration table (e.g., in a fabric host-tracking database) with the server's destination IP address (i.e., the DHCP server's IP address or Uniform Resource Locator (URL)) and Routing Locator (RLOC) mapping with associated service policy.

When an Edge Device (ED) receives a host's (i.e., client device's) DHCP packet, it may query the MS (e.g., with a map-request) for the "DHCP_SRV" (i.e., SERVICE_TYPE). The MS may respond with the destination IP address (i.e., DHCP server's IP address) and RLOC mapping with associated policy. The ED may receive the DHCP server's address, RLOC, and associated policy and may installs a map-cache for it on the ED. Accordingly, at the edge, there may be no need for the DHCP server's IP address in the relay and this process may become dynamic. The aforementioned example used DHCP as the service, but other services may be used consistent with embodiments of the disclosure.

Another option may be, in response to a map-request for the service, the MS may respond with a URL (e.g., "dhcp.abc.com") and the border device's RLOC to the ED. Then the ED may resolve the service's server's destination IP address (i.e., DHCP, Authentication, Authorization and Accounting (AAA), and other shared services server's IP address) and install map-caches with this destination to RLOC mapping. For example, {Service-type:Service-IP, VN} e,g Services {DHCP::10.1.1.1,VN1; DHCP::20.1.1.1, VN2; AAA::5.5.5.5,*}. Based on this, the map-cache may be populated and service may be provide with the corresponding IP address (e.g., AAA in the above may be provided with IP 5.5.5.5.) The same process may apply to other services. This may allow the ED to have a minimal configuration for example.

FIG. 1 shows a system 100 consistent with embodiments of the disclosure for providing services with policy control. As shown in FIG. 1, system 100 may comprise a first network 102, a plurality of client devices 104, a second network 106, a map server 108, and a server providing a service 110. First network 102 may comprise a plurality of network devices including, but not limited to, a router 112, a first edge device 114, a second edge device 116, intermediate network devices (not shown), and a border device 118. Plurality of client devices 104 may comprise a first client device 120 and a second client device 122. Second network 106 may comprise a network outside of first network 102, for example, a network to the cloud (e.g., the Internet). Map server 108 may have and maintain a fabric host-tracking database 124. Server providing a service 110 may provide any service (e.g., cloud based) comprising, but not limited to, DHCP, DNS, Authentication, Authorization and Accounting (AAA), and other shared services.

The plurality of network devices in first network 102 may comprise, but are not limited to, switches and routers for example. First network 102 may comprise any number of network devices. Plurality of client devices 104 may comprise any number of client devices and is not limited to two. Each of plurality of client devices 104 may comprise any type device wishing to communicate over first network 102. For example, each of plurality of client devices 104 may comprise, but are not limited to, a Wi-Fi access point, a cellular base station, a tablet device, an Internet-of-Things (IoT) device, a mobile device, a smart phone, a telephone, a remote control device, a set-top box, a digital video recorder, a cable modem, a personal computer, a notebook computer, a network computer, a mainframe, a router, or other similar microcomputer-based device.

First network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., first network 102) through FE devices (e.g., first edge device 114 and second edge device 116). The traffic may be routed through first network 102 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing Layer-2 and Layer-3 services on top of the underlay. The fabric network may have endpoints (e.g., plurality of client devices 104) connected to it.

The elements described above of system 100 (e.g., map server 108, server providing a service 110, router 112, first edge device 114, second edge device 116, border device 118, first client device 120, or second client device 122) may be practiced in hardware and/or in software (including firmware, resident software, micro-code, etc.) or in any other circuits or systems. The elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of system 100 may be practiced in a computing device 400.

Figure 2:
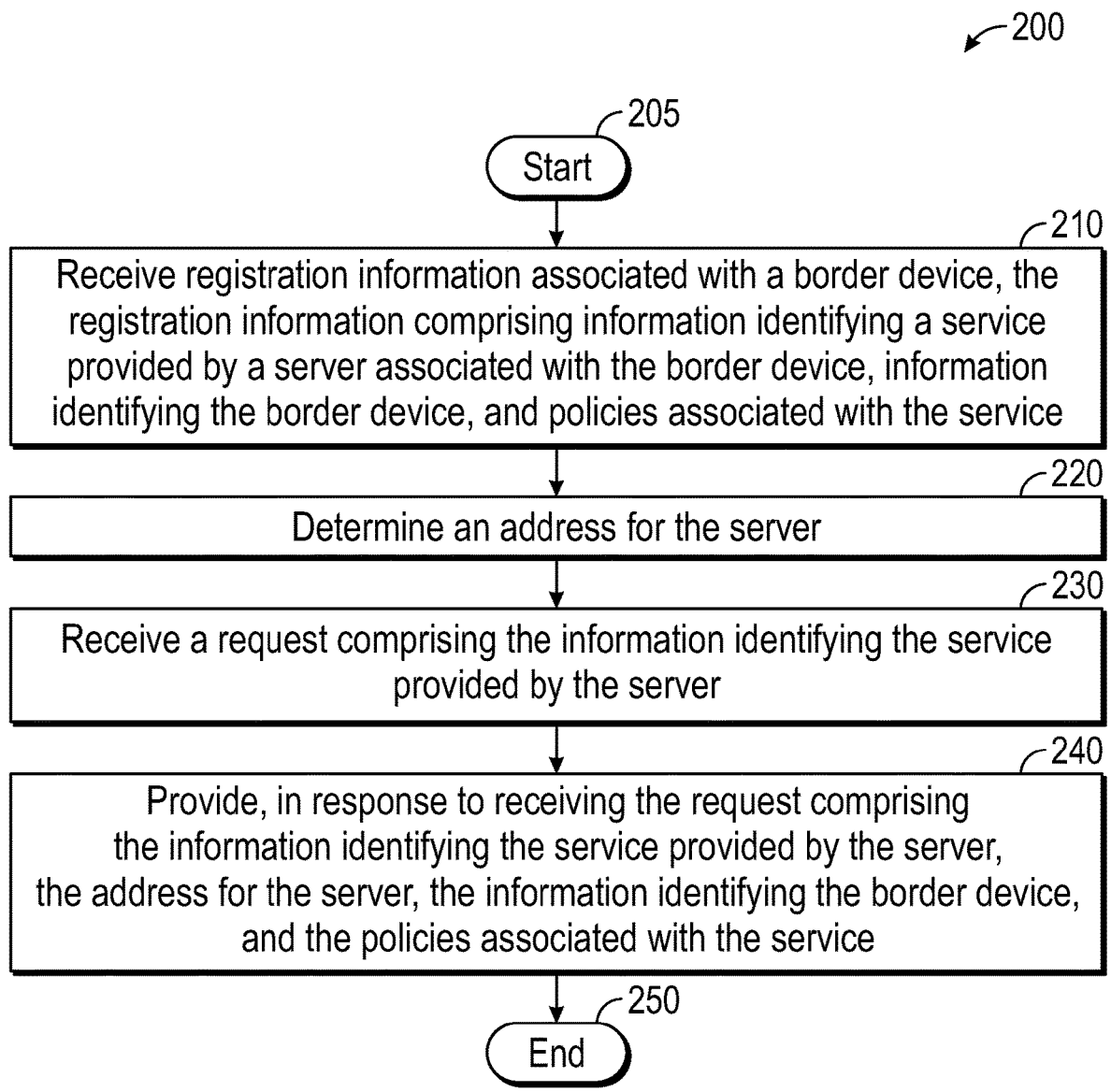
FIG. 2 is a flow chart of a method for providing services with policy control.
Figure 3:
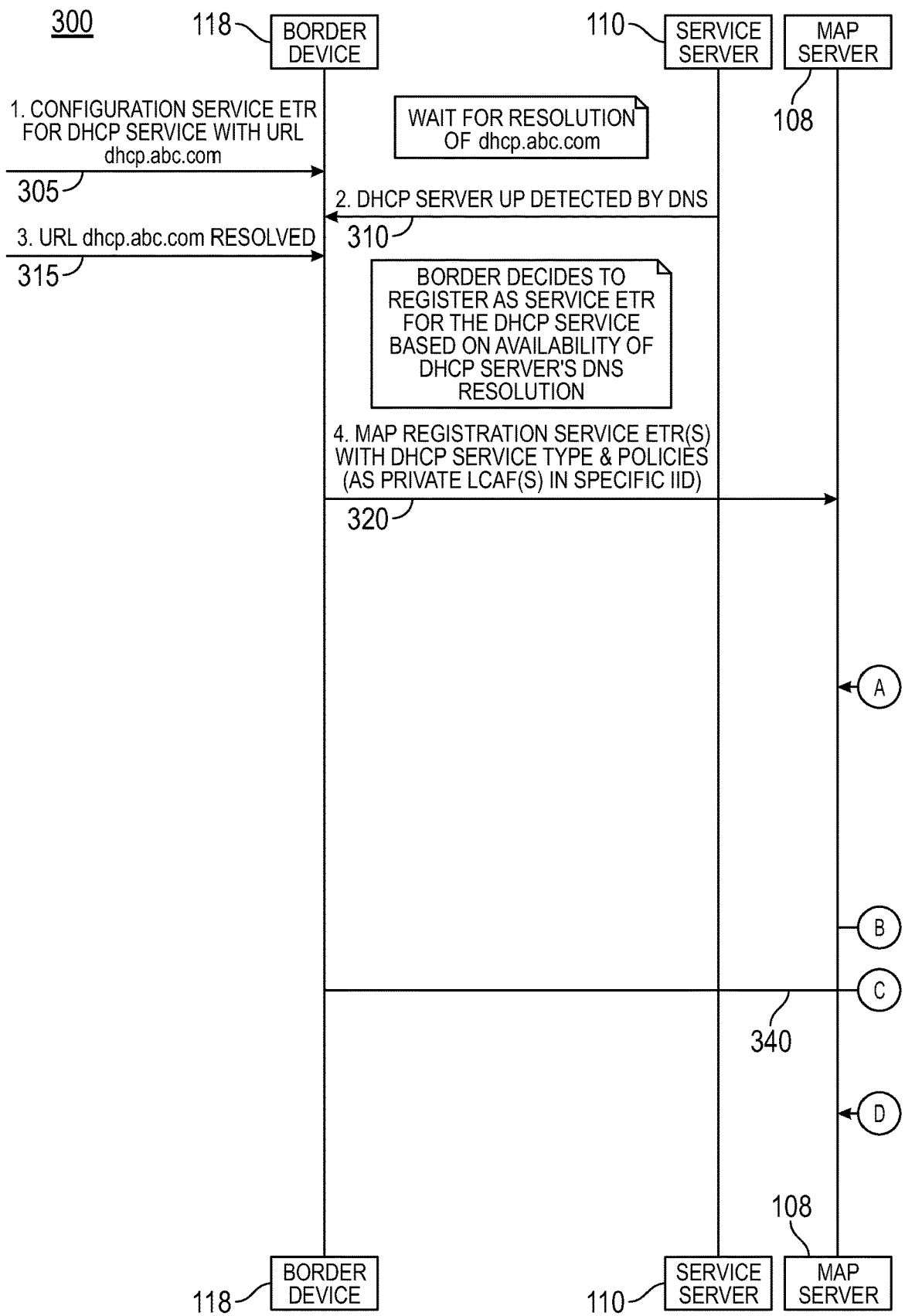
FIG. 3 is a flow diagram of a method for providing services with policy control.
Figure 3:
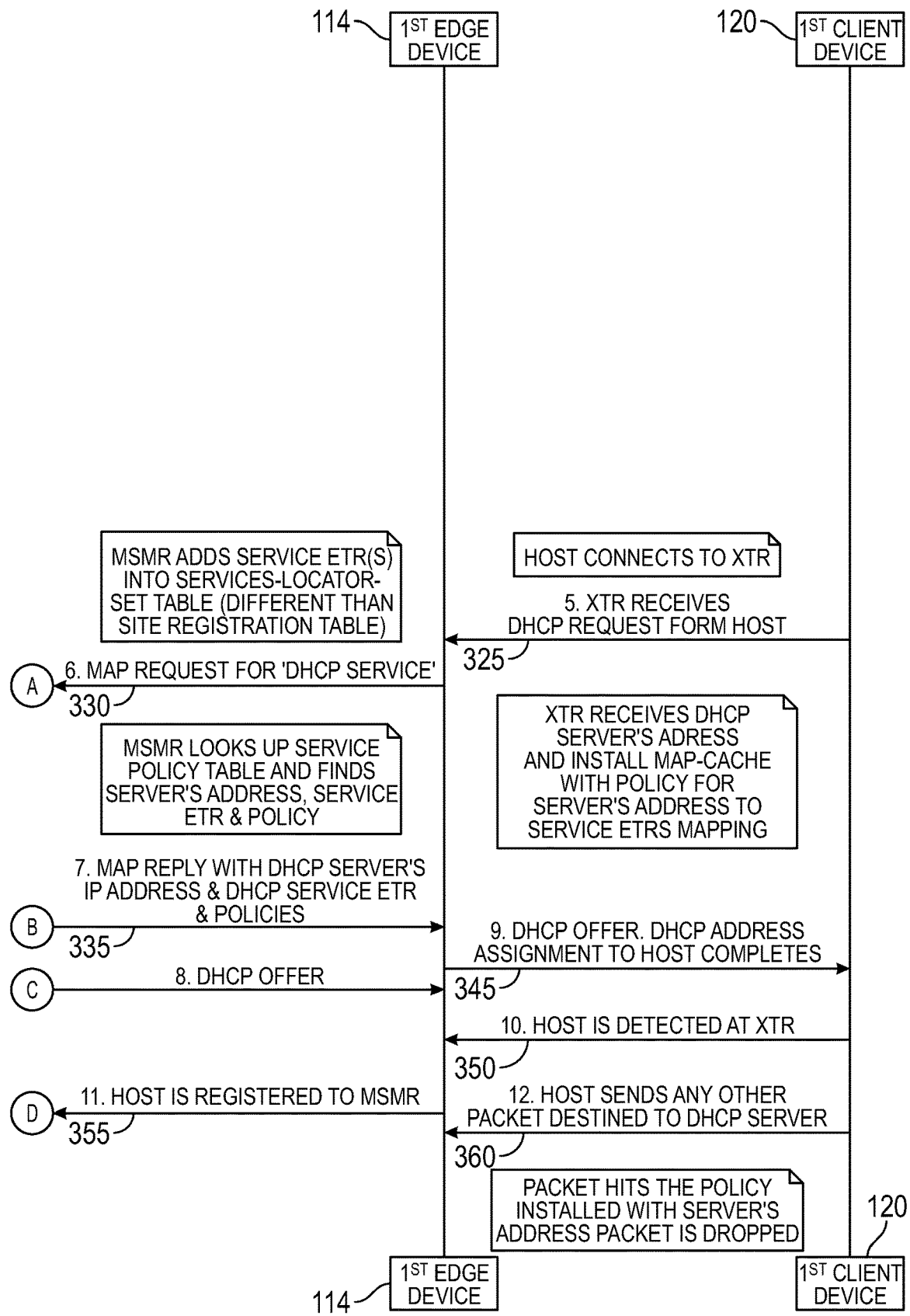

FIG. 2 is a flow chart setting forth the general stages involved in a method 200 consistent with an embodiment of the disclosure for providing services with policy control. Method 200 may be implemented using map server 108 as described in more detail above with respect to FIG. 1. Method 200 may be described in conjunction with flow diagram 300 of FIG. 3. Ways to implement the stages of method 200 will be described in greater detail below.

Method 200 may begin at starting block 205 and proceed to stage 210 where map server 108 may receive registration information associated with border device 118. The registration information may comprise information identifying a service provided by a server (e.g., server providing the service 110) associated with border device 118, information identifying border device 118, and policies associated with the service. For example, border device 118 (e.g., a site border/xTR) may be configured using URLs for the applications for which, servers would be located behind border device 118. Border device 118 may register to the enterprise fabric control plane (i.e., map server 108) with the applications by registering itself as the RLOC and EID as the "distinguished name" for that application or service. (Stage 305, 310, 315, and 320 of FIG. 3). Map server 108 may be configured with policies specific to these different applications. In other embodiments, these policies may be sent to map server 108 during registration by border device 118. The information identifying the service provided by the server associated with the border device may comprise an Endpoint Identifier (EID), which may comprise, for example, an Internet Protocol (IP) address, a Media Access Control (MAC) address, the distinguished name identifying the service, or a Uniform Resource Locator (URL) identifying the service. The information identifying the border device may comprise a Routing Locator (RLOC) locator type such as a default locator or a specific service locator for example.

Map server 108 may keep trying with a DNS at frequent interval to resolve the URL for the application, which may fail because the application server may not be connected yet. In other embodiments, map server 108 may be re-registered to resolve IP addresses when those services are announced or advertised. An edge device (e.g. first edge device 114) may recognize that an application packet in the forwarding plane and may request map server 108 (e.g., using the service name as "distinguished name EID" for that application) for the RLOC for that application server. Because map server 108 may not have the URL for the application resolved yet, it may reply with having drop action. Edge device (e.g., first edge device 114) may drop the application packet.

From stage 210, where map server 108 receives the registration information associated with border device 118, method 200 may advance to stage 220 where map server 108 may determine an address for the server (e.g., server providing the service 110). For example, the application server may be connected to border device 118 (e.g., a site border/xTR). The service may now be deployed and announced or advertised by respective devices. Map server 108 may now be able to resolve the URL for the application or registers the IP or Media Access Control (MAC) addresses for the service based on service announcements of its devices. Map server 108 may associate IP or MAC addresses with the "distinguished name" EID for the application or service. Map server 108 may keep this information in fabric host-tracking database 124 with the configured policies for these applications or services.

Once map server 108 determines the address for the server (e.g., server providing the service 110) in stage 220, method 200 may continue to stage 230 where map server 108 may receive a request comprising the information identifying the service provided by the server (e.g., server providing a service 110). For example, first edge device 114 may recognizes that an application packet had been received from first client device 120 (stage 325 of FIG. 3) and may request map server 108 for the RLOC for that application. (Stage 330 of FIG. 3).

After map server 108 receives the request comprising the information identifying the service provided by the server (e.g., server providing the service 110) in stage 230, method 200 may proceed to stage 240 where map server 108 may provide, in response to receiving the request comprising the information identifying the service provided by the server (e.g., server providing the service 110), the address for the server (e.g., server providing the service 110), the information identifying border device 118, and the policies associated with the service. (Stage 335 of FIG. 3). For example, in response, map server 108 may not only send the RLOC for the application server (e.g., server providing the service 110), but may also specify policies for that application. For some services, map server 108 may also send a list of device IP addresses as well as their corresponding RLOCs for the service devices. Border device 118 may install those policies in its forwarding hardware for the traffic towards the application server or service devices. Future traffic may then be forwarded according to the installed policies. (Stages 340, 345, 350, 355, and 360 of FIG. 3). Once map server 108 provides the address for the server (e.g., server providing the service 110), the information identifying border device 118, and the policies associated with the service in stage 240, method 200 may then end at stage 250.

For multisite application provisioning or deployment, embodiments of the disclosure may include the MS notifying to a site BD for all the applications the site is planning to host for other sites. The MS may also notify the application's policies in the notifications. For multisite, the site BD may register to a transit control plane (e.g., a T-MS) for the specific application by registering the BD using the EID as the resolved IP/MAC address as well as the "distinguished name" and the policy for that application. (In another embodiment, the T-MS may also be pre-configured with the policies for all the applications). The T-MS may propagate this registration and policy to another site's local MS to use the remote site's server for the application. Or other site's edge device may forward the packet to a default border Egress Tunnel Router (ETR) and that default ETR border may request to the T-MS for the application's RLOC and policies. If the location of any service or application changes, the MS may be re-registered with their new locations (i.e., RLOCs). The MS may update existing map-caches using any map-cache update process. Any policy change for these services may also be updated using existing policy change processes.

Embodiments of the disclosure may provide a zero day, zero touch deployment of enterprise fabric applications or services where there may be no need to know the application's, service's, or server's locations and their IP/subnet addresses in advance. These services may be unicast, multicast, or broadcast. Also, the whole network may not need to change when later these applications, services, or servers are deployed. Instead, the networks may dynamically detect the applications, services, or servers locations and subnets, automatically apply correct policies, and forward the relevant traffic towards these servers. Any other traffic not intended to go towards these servers (e.g., even if the destination address is the server's address) may be dropped at the edge of the network per the configured policies in the fabric control plane. This may not only solve aforementioned problems, but may also make the enterprise fabric networks more secured.

Figure 4:
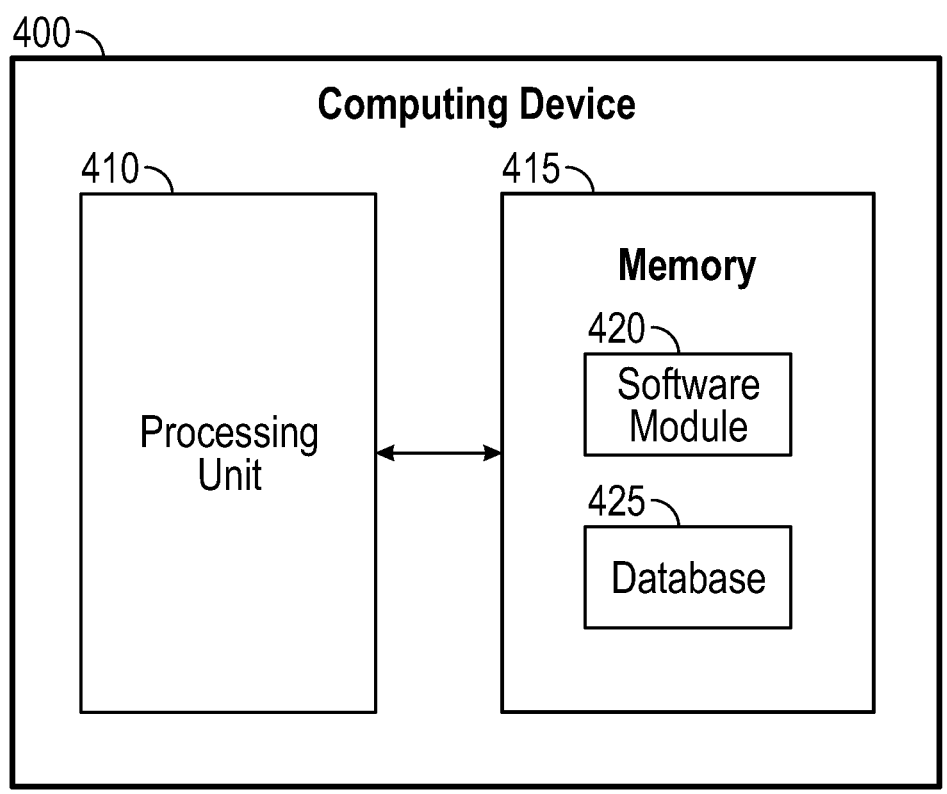
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing services with policy control as described above with respect to FIG. 2 and FIG. 3. Computing device 400, for example, may provide an operating environment for map server 108, server providing a service 110, router 112, first edge device 114, second edge device 116, border device 118, first client device 120, or second client device 122. Map server 108, server providing a service 110, router 112, first edge device 114, second edge device 116, border device 118, first client device 120, and second client device 122 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a map server of a fabric network, registration information associated with a service to be provided by a server to be connected to a border device of the fabric network, the registration information comprising information identifying an endpoint identifier comprising a unique uniform resource locator for the service to be provided by the server to be connected to the border device, information identifying the border device as a routing locator for the service to be provided by the server to be connected to the border device, and policies associated with the service to be provided by the server to be connected to the border device;
   resolving the unique uniform resource locator address for the server;
   receiving a request comprising the information identifying the service provided by the server; and
   providing, in response to receiving the request comprising the information identifying the service provided by the server, an address for the server, the information identifying the border device, and the policies associated with the service.

2. The method of claim 1, wherein receiving the registration information comprises receiving the registration information from the border device.

3. The method of claim 1, further comprising saving the registration information and the address for the server on a database located on the map server.

4. The method of claim 1, wherein receiving the request comprises receiving the request from a Fabric Edge (FE) device.

5. The method of claim 1, further comprising providing the information identifying the border device, the policies associated with the service, and the address to a fabric edge device.

6. The method of claim 5, further comprising forwarding future traffic for the service to the server according to the policies associated with the service.

7. The method of claim 1, wherein receiving the request comprises receiving the request before resolving the unique uniform resource locator address for the server; and
   sending, in response to the request received before resolving the unique uniform resource locator address for the server, a reply comprising drop action.

8. The method of claim 1, wherein resolving the unique uniform resource locator address for the server comprises:
   receiving an announcement from the server once being connected to the border device, the announcement comprising an internet protocol address and a media access control access of the server; and
   associating the internet protocol address and the media access control access of the server with the unique uniform resource locator for the service.

9. A system comprising:
   a memory storage; and
   a processing unit coupled to the memory storage, wherein the processing unit is operative to:
     receive registration information associated with a service to be provided by a server to be connected to a border device of the fabric network, the registration information comprising information identifying an endpoint identifier comprising a unique uniform resource locator address for the service to be provided by the server associated with the border device, information identifying the border device as a routing locator for the service to be provided by the server to be connected to the border device, and policies associated with the service to be provided by the server to be connected to the border device;
     resolve the unique uniform resource locator address for the server;
     receive a request comprising the information identifying the service to be provided by the server; and
     provide, in response to receiving the request comprising the information identifying the service to be provided by the server, an address for the server, the information identifying the border device, and the policies associated with the service.

10. The system of claim 9, wherein the processing unit being operative to receive the registration information comprises the processing unit being operative to receive the registration information from the border device.

11. The system of claim 9, wherein the processing unit is disposed in a Map Server (MS).

12. A non-transitory computer-readable medium that stores a set of instructions which when executed perform a method executed by the set of instructions comprising:
   receiving, by a map server of a fabric network, registration information associated with a service to be provided by a server to be connected to a border device of the fabric network, the registration information comprising information identifying an endpoint identifier comprising a unique uniform resource locator for the service to be provided by the server to be connected to the border device, information identifying the border device as a routing locator for the service to be provided by the server to be connected to the border device, and policies associated with the service to be provided by the server to be connected to the border device;

resolving the unique uniform resource locator address for the server;

receiving a request comprising the information identifying the service to be provided by the server; and providing, in response to receiving the request comprising the information identifying the service to be provided by the server, an address for the server, the information identifying the border device, and the policies associated with the service.

13. The non-transitory computer-readable medium of claim 12, wherein receiving the registration information comprises receiving the registration information from the border device.

14. The non-transitory computer-readable medium of claim 12, further comprising saving the registration information and the address for the server on a database located on the map server.

15. The non-transitory computer-readable medium of claim 12, wherein receiving the request comprises receiving the request from a Fabric Edge (FE) device.

16. The non-transitory computer-readable medium of claim 12, wherein receiving the request comprises receiving the request before resolving the unique uniform resource locator address for the server; and sending, in response to the request received before resolving the unique uniform resource locator address for the server, a reply comprising drop action.

17. The non-transitory computer-readable medium of claim 12, wherein resolving the unique uniform resource locator address for the server comprises:

receiving an announcement from the server once being connected to the border device, the announcement comprising an internet protocol address and a media access control access of the server; and associating the internet protocol address and the media access control access of the server with the unique uniform resource locator for the service.

18. The non-transitory computer-readable medium of claim 12, further comprising:

installing the policies for the service in a forwarding table for the fabric network.

19. The non-transitory computer-readable medium of claim 12, wherein resolving the unique uniform resource locator address for the server comprises resolving the unique uniform resource locator address for the server wherein resolving the unique uniform resource locator address for the server fails when the server is not connected yet.

20. The non-transitory computer-readable medium of claim 12, further comprising retrying resolving the unique uniform resource locator address for the server at after a predetermined time interval after resolving the unique uniform resource locator address for the server fails.

* * * * *